United States Patent
Yun

[11] Patent Number: 5,771,329
[45] Date of Patent: Jun. 23, 1998

[54] RECORDING MODE CONTROL METHOD FOR COMBINED VIDEO APPLIANCES

[75] Inventor: Seok-Ho Yun, Kyungki-do, Rep. of Korea

[73] Assignee: Samsung Electronics Co., Ltd., Kyungki-Do, Rep. of Korea

[21] Appl. No.: 729,383

[22] Filed: Oct. 17, 1996

[30] Foreign Application Priority Data

Feb. 27, 1996 [KR] Rep. of Korea ............... 96-4936

[51] Int. Cl.$^6$ ........................................ H04N 5/76
[52] U.S. Cl. ................................. 386/46; 386/83
[58] Field of Search ................. 386/46, 83; 348/731, 348/732; 455/179.1, 181.1, 185.1, 186.1, 186.2; H04N 5/76, 5/92, 5/50

[56] References Cited

U.S. PATENT DOCUMENTS

| | | | |
|---|---|---|---|
| 5,535,066 | 7/1996 | Min | 386/46 |
| 5,575,000 | 11/1996 | Park et al. | 386/46 |
| 5,625,423 | 4/1997 | Ito | 386/46 |
| 5,631,995 | 5/1997 | Weissensteiner et al. | 386/46 |
| 5,687,273 | 11/1997 | Huh | 386/46 |

*Primary Examiner*—Thai Tran
*Attorney, Agent, or Firm*—Sughrue, Mion, Zinn, Macpeak & Seas, PLLC

[57] ABSTRACT

A recording mode control method for combined video appliances whereby necessary information of a specific channel broadcasting signal may be selectively recorded, and in the event that the specific channel broadcasting signal has unnecessary information, another channel broadcasting signal may be displayed on a screen by a user. If a new channel selection data is inputted during the recording of a specific channel broadcasting signal, the specific channel recording mode is switched to a stop mode or a still mode and the presently selected channel broadcasting signal is displayed on a screen. Thereafter, if the channel selection data of the specific channel broadcasting signal previously recorded is inputted again, the recording mode for the specific channel is automatically resumed and the specific channel broadcasting signal is recorded again.

3 Claims, 2 Drawing Sheets

5,771,329

RECORDING MODE CONTROL METHOD FOR COMBINED VIDEO APPLIANCES

BACKGROUND OF THE INVENTION

1. Field of the Invention

The present invention relates a recording mode control method for combined video appliances wherein a television receiver and a composite video signal recording/reproducing apparatus are incorporated together. In particular, the present invention relates to a recording mode control method for combined video appliances whereby if data for selecting a new channel is inputted during the recording of a specific channel broadcasting signal in a recording medium, a recording mode for recording the specific channel broadcasting signal being presently recorded is switched to a still mode and the presently selected channel broadcasting signal is displayed, and if data for selecting the specific channel is inputted again during the display of the presently selected channel broadcasting signal within a predetermined time, the recording mode for recording the specific channel broadcasting signal is automatically reopened.

2. Description of the Related Art

To search broadcasting signals of other channels during the recording of a specific channel broadcasting signal utilizing a conventional combined video appliance, such as a combined video recorder and television device, a user must first stop the recording of the specific channel broadcasting signal, and then search other channel broadcasting signals by entering channel selection data. In order for the user to resume the recording of the specific channel broadcasting signal previously recorded after completion of the channel search, he must enter the recording mode for recording the specific channel broadcasting signal again.

SUMMARY OF THE INVENTION

The present invention has been made to solve the problems involved in the prior art. Therefore, it is an object of the present invention to provide a recording mode control method for combined video appliances whereby if channel selection data for searching another channel broadcasting signal is inputted while a specific channel broadcasting signal being received and recorded, the recording mode is switched to a still mode, the selected channel broadcasting signal is displayed on a display screen, and, thereafter, if the channel selection data of the specific channel broadcasting signal which was previously recorded is inputted within a predetermined time, the recording of the specific channel broadcasting signal automatically resumes.

In order to achieve the above object, the present invention provides a recording mode control method for combined video appliances comprising the steps of:

1) recording a broadcasting signal of a specific channel selected and received by an input of channel selection and recording mode data;

2) first determining whether or not data for selecting a new channel is inputted during the recording step;

3) switching a recording mode for recording the specific channel broadcasting signal to a stop mode or a still mode, storing the specific channel data, and performing a timing operation, simultaneously, if it is determined that data for selecting a new channel is inputted during the first determining step;

4) second determining whether or not a predetermined time has elapsed as well as displaying the new channel broadcasting signal which is tuned according to the channel selection data inputted;

5) third determining whether or not further new channel selection data is inputted before the predetermined time has elapsed;

6) fourth determining whether or not the further new channel selection data coincides with the stored specific channel data if it is determined that further new channel selection data has been inputted; and 7) automatically recording the specific channel broadcasting signal again if it is determined that the further new channel selection data coincides with the stored specific channel data.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 1:
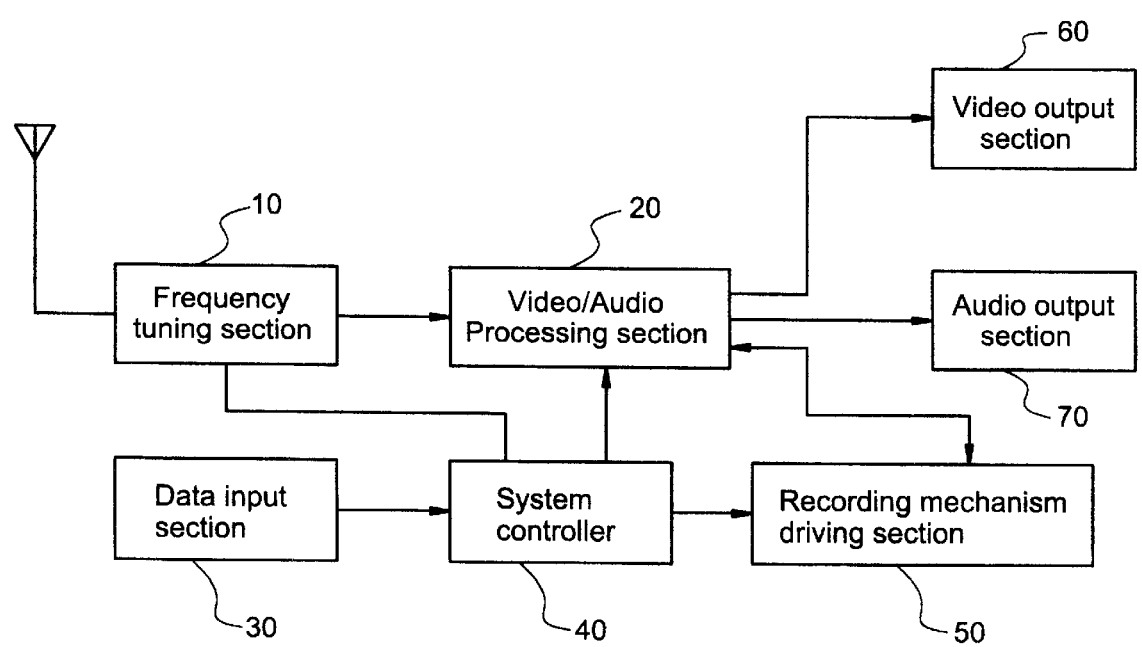
FIG. 1 is a block diagram of a recording mode control apparatus for combined video appliances using the method of the preferred embodiment of the present invention.

FIG. 1 is a block diagram of a recording mode control apparatus for combined video appliances using the method of the preferred embodiment. The apparatus of FIG. 1 is suitable for use in a combined video appliance employing a single tuner. The apparatus of FIG. 1 is structured to operate so that if new channel selection data is inputted while a specific channel broadcasting signal is recorded, the recording mode for recording the specific channel broadcasting signal is temporarily stopped and the broadcasting signal of the selected new channel is displayed, and if the channel selection data of the specific channel is inputted again within a predetermined time, the recording of the specific channel broadcasting signal is automatically resumed.

The circuit of FIG. 1 is provided with a frequency tuning section 10 for tuning a broadcasting signal received through an antenna, a video/audio processing section 20 for processing the received broadcasting signal as a video cassette recorder (VCR) recording signal or a television output signal, and a system controller 40 for controlling tuning data of the frequency tuning section 10 in accordance with data provided from a data input section 30 which receives input data for controlling the channel section and the operation of the system. The system controller 40 has built-in memory and counter, so that it can determine whether or not the presently selected channel data coincides with the channel data which has been stored in the memory within a predetermined time, and controls a recording mechanism according to the determination result. The system controller 40 can be constituted of a known microprocessor based device programmed in the desired manner.

The circuit of FIG. 1 is also provided with a recording mechanism driving section 50 for driving the recording mechanism which records/reproduces the broadcasting signal in accordance with control data provided from the system controller 40. A video output section 60 and an audio output section 70 are also provided.

Figure 2:
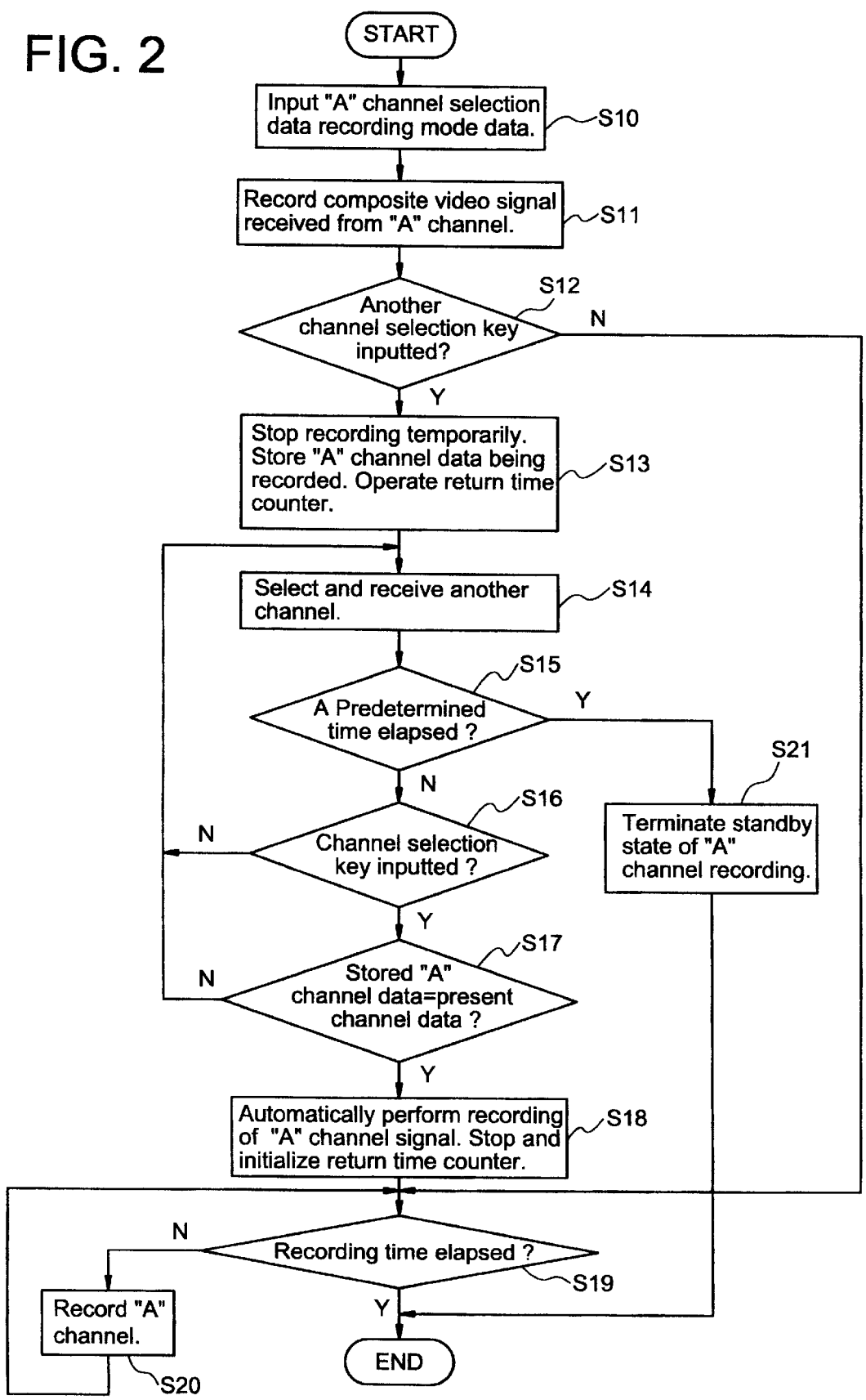
FIG. 2 is a flow chart illustrating the operation of the apparatus of FIG. 1.

The operation of the recording mode control apparatus described above will now be explained in detail with reference to FIG. 2.

If a user enters specific channel selection data, such as "A", and recording mode data by means of the data input section 30 in FIG. 1 (step S10 in FIG. 2), the system controller 40 scans the data inputted through the data input section 30, and controls the operation of the frequency tuning section 10, video/audio processing section 20, and recording mechanism driving section 30, respectively, in accordance with the inputted data, to record on the recording medium, such as tape in a video cassette, the broadcasting signal of the specific channel (step S11).

While the specific channel broadcasting signal is recorded on the recording medium at step S11, the system controller 40 checks if data for selecting a new channel is inputted through the data input section 30 (step S12). For instance, if new channel selection data is inputted through the data input section 30, the system controller 40 switches the recording mode to a still mode or a stop mode (step S13), stores the specific channel data "A", and displays the broadcasting signal of the selected new channel on a display screen. Also, a time-counting operation is initiated (step S14).

As described above, as the system controller 40 displays the new channel broadcasting signal, it determines whether or not the elapsed time from the beginning of the counting operation reaches a predetermined time (step S15). If it is determined that the counted time has not reached the predetermined time, the system controller 40 then determines whether or not further new channel selection data is inputted (step S16). If it is determined that further new channel selection data is inputted as a result of the determination at step S16, the system controller 40 then determines whether the inputted channel selection data coincides with the specific channel selection data stored at step S13 (step S17). If it is determined that the presently inputted channel selection data coincides with the stored specific channel selection data, the system controller 40 outputs the control signals to the peripheral sections illustrated in FIG. 1 so that the specific channel broadcasting signal is automatically recorded again (step S18), and initializes the counted time data. Thereafter, the system controller 40 determines whether or not the predetermined recording time has elapsed (step S19), and automatically switches the recording mode to a stop mode when the predetermined recording time has elapsed.

If it is determined that the predetermined time has elapsed by the time counting operation at step S15, the system controller terminates the standby state of the specific channel recording (step S21). Also, if it is determined that the predetermined recording time has not yet elapsed at step S19, recording of the specific channel broadcasting signal continues.

From the foregoing, it will be apparent that the present invention provides advantages in that if new channel selection data is inputted by the operator while a specific channel broadcasting signal is being recorded in a combined video appliance employing a single tuner, the recording mode of the specific channel is switched to a recording standby mode, and if the specific channel selection data is inputted again within a predetermined time, the recording of the specific channel broadcasting signal automatically resumes without the necessity of inputting the recording mode data. This provides convenience in use. Further, according to the present invention, the user selectively records the necessary information of the broadcasting signal of a specific channel, while displaying broadcasting information of other channels if he determines that the specific channel broadcasting signal has unnecessary information temporarily.

While the present invention has been described and illustrated herein with reference to the preferred embodiment thereof, it will be understood by those skilled in the art that various changes in form and details may be made therein without departing from the scope of the invention as defined by the appended claims.

What is claimed is:

1. A recording mode control method for combined video appliances comprising the steps of:

1) recording a broadcasting signal of a specific channel selected and received in response to input of channel selection and recording mode data;

2) determining whether or not data for selecting a new channel is inputted during recording of said specific channel broadcasting signal in step 1;

3) switching a recording mode for recording said specific channel broadcasting signal to a stop mode or a still mode, storing said specific channel data, and performing a time-counting operation, if it is determined that said data for selecting a new channel is inputted in step 2;

4) determining whether or not a predetermined time has elapsed and displaying a broadcasting signal of said new channel which is tuned according to said data for selecting a new channel inputted in step 2;

5) determining whether or not further new channel selection data is inputted before said predetermined time has elapsed as a result of determination in step 4;

6) determining whether or not said further new channel selection data coincides with said stored specific channel data if it is determined that said further new channel selection data is inputted in step 5; and 7) automatically recording said broadcasting signal of said specific channel again if it is determined that said further new channel selection data coincides with said specific channel data stored in step 6.

2. A recording mode control method as claimed in claim 1, further comprising the step of terminating a standby state of recording said broadcasting signal of said specific channel if it is determined that said predetermined time has elapsed in step 4.

3. A recording mode control method as claimed in claim 1, wherein said switching, said storing, and said performing in step 3 are performed simultaneously.

* * * * *